US005255125A

United States Patent [19]

Hale et al.

[11] Patent Number: 5,255,125
[45] Date of Patent: Oct. 19, 1993

[54] PARTICULATE OBSCURANT DISSEMINATOR AIR SOURCE

[75] Inventors: D. Jeffrey Hale, White Hall; William A. Adams, Baltimore, both of Md.

[73] Assignee: The United States of America as represented by the Secretary of the Army, Washington, D.C.

[21] Appl. No.: 997,009

[22] Filed: Dec. 28, 1992

[51] Int. Cl.[5] ........................ C09K 3/30; H01Q 15/18; G01J 1/00

[52] U.S. Cl. ................................... 359/889; 60/39.75; 102/334

[58] Field of Search ............ 102/334; 60/39.01, 39.75; 239/8, 160; 222/630; 406/38, 71, 93, 102; 359/889

[56] References Cited

U.S. PATENT DOCUMENTS

| | | | |
|---|---|---|---|
| H1,124 | 1/1993 | Rouse et al. | 60/39.75 |
| 3,608,822 | 9/1971 | Berthoud | 261/78.2 |
| 3,992,628 | 11/1976 | Karney | 250/338 |
| 4,484,195 | 11/1984 | Shaffer | 102/334 |
| 4,872,786 | 10/1989 | Braden | 406/68 |
| 5,115,633 | 5/1992 | Priser et al. | 60/39.01 |

FOREIGN PATENT DOCUMENTS 100770 2/1984 European Pat. Off. .

OTHER PUBLICATIONS

Fontanges et al., Trans. of Travaux Scientifiques; (France), pp. 301-302, 1971; abst. only supplied herewith.

Ritland et al., Pat. Applic. 882526 filed Mar. 1, 1978; abst. only supplied herewith.

*Primary Examiner*—Nelson Moskowitz

*Attorney, Agent, or Firm*—Anthony T. Lane; Edward Goldberg; Michael C. Sachs

[57] ABSTRACT

A particulate obscurant disseminator couples the shaft power of the host vehicle through a clutch and fluid coupling to a high ratio gear box whose output shaft drives a compressor of an automative-type turbocharger whose air output is fed to the input of a venturi type ejector where additional air flow is induced and mixed with pariculate from a bin supply to form an obscurant cloud.

8 Claims, 1 Drawing Sheet

OBSCURANT CLOUD 28

MATERIAL SUPPLY 24

FIG. 1

PARTICULATE OBSCURANT DISSEMINATOR AIR SOURCE

GOVERNMENTAL INTEREST

The invention described herein may be manufactured, used and licensed by or for the U.S. Government.

BACKGROUND OF THE INVENTION

Armies have used visual obscurants for centuries to protect their personnel from observation by their enemies. Presently, with the advent of laser rangefinders operating at near infrared and thermal imaging systems at mid and far infrared frequencies, the need for obscurant counter-measures at these wavelengths has become a primary protective requirement. The need for obscurants at even longer wavelengths is a necessity because of the recent development of "smart" munitions with millimeter wave seekers.

Known obscurants at these wavelengths are comprised of solid particles. Thin flakes are used for the infrared wavelength detection devices. Small high-aspect ratio fibers are used as an obscurant against millimeter wave detection devices.

The problem with aerosolizing these solid particles to form an obscurant cloud is that these obscurants require a large amount of propelling air. The basic rule of thumb developed by prior art experience with these materials is 10 pounds of air required for each pound of particulate dispensed. In the past, the use of an air ejector, such as the Rutstein AP-83, partially reduced the problem. Operating at about 30 psig, the Rutstein ejector acts as a venturi nozzle to induce about 5 pounds of air flow for every pound of air delivered to it. However, even with the AP-83, to generate an obscurant cloud at a flow rate of 10 pounds per minute requires a primary air source at 20 pounds per minute.

10 lb. air/1 lb. obscurant×10 lbs. obscurant÷5 (ejector induced-to-primary air ratio)=20 lbs./MIN.

Prior art conventional air compressor with this capacity would be huge and not practical for a mobile fighting vehicle. A blower with the flow capacity will not provide the aforementioned required pressure.

All smoke generators presently under development with the capability to disseminate infrared and millimeter wave obscurants use the bleed air from a turbine as the air source for the air elector. Usually these smoke generators are mounted on a host vehicle, such as a High Mobility Multipurpose Wheeled Vehicle or an Armored Personnel Carrier. The problem with these obscurant disseminators using turbines is that turbines are sophisticated, expensive engines requiring special skills for maintenance and repair. Their durability in today's mobile army battlefield environment is questionable.

SUMMARY OF THE INVENTION

The present invention relates to a particulate obscurant disseminator which utilizes shaft power supplied by the vehicle to be obscured, mechanically connected through a clutch and fluid coupling to a high ratio gearbox whose output shaft drives a compressor of an automotive-type turbocharger whose air output is fed to the input of a venturi type ejector where it induces additional air flow and is mixed with particulates from a material supply bin to form an obscurant cloud.

An object of the present invention is to provide an obscurant disseminator which produces the air required for particulate dissemination with a simple device powered by the host vehicle engine.

Another object of the present invention is to provide an obscurant (disseminator which can generate an obscurant cloud with a primary air source of 20 pounds per minute.

Another object of the present invention is to provide a particulate obscurant disseminator air source which can meet the 20 pounds/min requirement with 30 horsepower and weighs less than 200 pounds.

A further object of the present invention is to provide an obscurant disseminator which utilizes the compressor half of an automotive-type turbocharger which has proven reliability of use.

For a better understanding of the present invention, together with other and further objects thereof, reference is made to the following descriptions taken in connection with the accompanying drawing.

BRIEF DESCRIPTION OF THE DRAWING

FIG. 1 is a schematic representation of the particulate obscurant disseminator air source.

DETAILED DESCRIPTION OF THE PREFERRED EMBODIMENT

To calculate the power required to compress 260 cubic feet/minute of air from atmospheric pressure to 30 psig:

1. Assign a value for temperature:

$$T_a = 80° F. = 540° R$$

2. The formula for work per unit mass for a reversible, adiabatic compressor:

$$W_c = C_p \times T_a \times \left[ (P_2/P_1)^{(\frac{\gamma-1}{\gamma})} - 1 \right]$$

where
$C_p$=specific heat of air at constant pressure=0.25
$\epsilon = C_p/C_v = 1.4$
$C_v$=specific heat of air at constant vol.=0.17 Btu/lb °R
$P_1$=atmospheric pressure=14.7 psia
$P_2$=30 psig 44.7 psia
therefore:
$W_c = 0.25 \times 540 \times$ $W_c = 0.25 \times 540 \times [(44.7)/(14.7)^{(1.4-1)/(1.4)}] - 1 = 50.5$ Btu/lb.
$-1 = 50.5$ Btu/lb.

3. Using an 80 percent efficiency factor for the compressor, the work becomes:

$$50.5 \text{ Btu/lb} \div 80\% = 63.1 \text{ Btu/lb}$$

4. Multiplying by the mass flow rates and converting to horsepower yields the following:

$$63.1 \frac{\text{Btu}}{\text{lb}} \times 0.0765 \frac{\text{lb}}{\text{ft}^3} \times 260 \frac{\text{ft}^3}{\text{Min}} \times$$

$$\frac{\text{hp}}{42.4 \text{ Btu/Min}} = 29.6 \text{ hp}$$

A typical commercial 2-stage compressor has the following characteristics:

| CFM @ 100 psig | 140 |
|---|---|
| Cost | $3,000 |
| Weight | 600 pounds |
| Horsepower Required | 25 |

It would take two of these units to meet the 20 pounds per minute requirement.

$$20 lb/min \times 13.07 cu\ ft/lb = 260 CFM$$

With mounting and power transfer apparatus, the prior art combination could easily weigh 1500 pounds and require 50 horsepower. The present invention would require only 30 horsepower and weigh less than 200 pounds.

Figure 1:
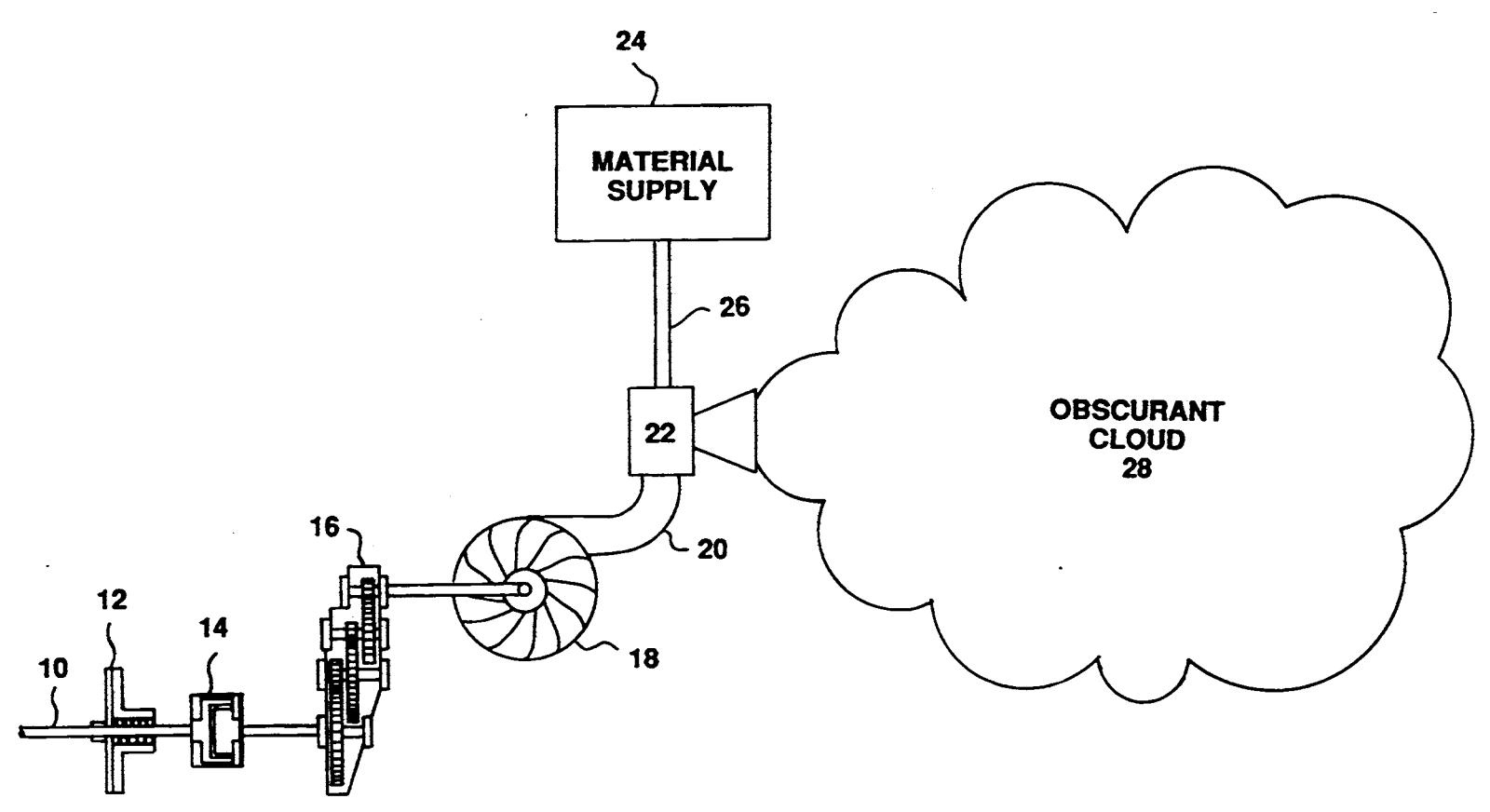

In operation, referring to FIG. 1 the power is supplied by the vehicle engine (not shown) to an input shaft member 10 which rotates at 1500 RPM. Shaft 10 is mechanically connected to an electric clutch 12 which is used to engage or disengage the disseminator systems. A fluid coupling 14 is mechanically coupled to electric clutch 12. Coupling 14 is used to dampen impact loading of the disseminator system on the input shaft 10. A gearbox member 16 is mechanically coupled to the output side of the fluid coupling 14. Gear box 16 has an input to output ratio of 1 to 40 thus will step up the shaft 10 rpm from 1500 RPM to 60,000 RPM required by compressor 18 which is mechanically linked to the output of gear box 16. The air output of compressor 18 is supplied to the input 20 of venturi ejector 22, where it will induce additional air flow and is mixed with particulate from the material supply container 24 via supply line 26 to form an obscurant cloud 28.

While a specific embodiment of the invention has been shown and described in detail to illustrate the application of the principles of the invention, it will be understood that the invention may be embodied otherwise without departing from such principles.

What is claimed is:

1. A particulate obscurant disseminator air source which comprises:
    means for generating rotational torque;
    disengaging means for isolating said rotational torque means;
    means for dampening impact loading mechanically coupled to said disengaging means;
    gear box means for stepping up the RPM of said rotational torque means;
    compressor means mechanically coupled to the output of said gear box means;
    ejector means coupled to said compressor means for inducing air flow;
    container means coupled to said ejector means for providing the particulate mixed with said additional air flow of said elector means to form an obscurant cloud which acts as a counter measure at near, mid and far infrared wavelength used by laser range finders and thermal imaging systems or millimeter wavelengths used by radars and.

2. A particulate obscurant disseminator as recited in claim 1 wherein said means for generating rotational torque include an input shaft rotating at 1500 RPM.

3. A particulate obscurant disseminator air source as described in claim 2 wherein said means for disengaging said torque means includes an electric clutch means.

4. A particulate obscurant disseminator air source as recited in claim 3 wherein said means for dampening impact loading includes a fluid coupling means.

5. A particulate obscurant disseminator air source as recited in claim 4 wherein said gear box means includes means for stepping up the input to output by a factor of 40.

6. A particulate obscurant disseminator air source as recited in claim 5 wherein said compressor means includes a compressor operating at 60,000 RPM.

7. A particulate obscurant disseminator air source as recited in claim 6 wherein said ejector means includes a venturi ejector.

8. A particulate obscurant disseminator air source as recited in claim 7 wherein said container means includes obscurants made of fibers for counter measures at millimeter wave lengths and flakes for counter measures against infrared wavelength detection devices.

* * * * *